(12) United States Patent
Oumi

(10) Patent No.: US 8,405,887 B2
(45) Date of Patent: Mar. 26, 2013

(54) SCANNER AND SHADING CORRECTION METHOD

(75) Inventor: Hayato Oumi, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 599 days.

(21) Appl. No.: 12/591,581

(22) Filed: Nov. 24, 2009

(65) Prior Publication Data

US 2010/0134855 A1    Jun. 3, 2010

(30) Foreign Application Priority Data

Dec. 1, 2008 (JP) ................. P2008-306283

(51) Int. Cl.
*H04N 1/04* (2006.01)
*H04N 1/40* (2006.01)

(52) U.S. Cl. ............. 358/475; 358/498; 358/461

(58) Field of Classification Search ............ 358/475, 358/461, 498
See application file for complete search history.

(56) References Cited

U.S. PATENT DOCUMENTS

2008/0170273 A1* 7/2008 Hashizume ............ 358/461

FOREIGN PATENT DOCUMENTS

| JP | 06-141179 A | 5/1994 |
| JP | 10-294870 A | 11/1998 |
| JP | 2006-270604 | 10/2006 |

OTHER PUBLICATIONS

Official Action, issued on Jul. 3, 2012, in the counterpart Japanese application.

* cited by examiner

*Primary Examiner* — Charlotte M Baker
*Assistant Examiner* — Rury Grisham
(74) *Attorney, Agent, or Firm* — Nath, Goldberg & Meyer; Jerald L. Meyer; Scott C. Langford

(57) ABSTRACT

A scanner includes an image scanning mechanism, a foreign object location detector, a foreign object location storage, a correction processor, and a shading correction processor. The foreign object location detector detects a pixel at a location of a foreign object adhered to an optical mirror of the image scanning mechanism by use of a first reference image data obtained by scanning a white reference plate by the image scanning mechanism at an initial operation after power-on of the scanner. The foreign object location storage stores a location of the pixel at the foreign object location in the main scanning direction detected by the foreign object location detector. The correction processor corrects a waveform in a predetermined range including the foreign object location detected by the foreign object location detector so as to be formed in a trapezoidal shape with respect to a second reference image data obtained by scanning the white reference plate by the image scanning mechanism when scanning an original. The shading correction processor performs a shading correction to an original image data by use of the second reference image data corrected by the correction processor.

8 Claims, 11 Drawing Sheets

SCANNER AND SHADING CORRECTION METHOD

CROSS REFERENCE TO RELATED APPLICATION

This application is based upon and claims the benefit of priority from the prior Japanese Patent Application No. 2008-306283, filed on Dec. 1, 2008, the entire contents of which are incorporated herein by reference.

BACKGROUND OF THE INVENTION

1. Field of the Invention

The present invention relates to a scanner for scanning an image of an original, and a shading correction method for the scanner.

2. Description of the Related Art

A scanner provided in a copying machine and the like optically scans an image of an original by irradiating light to the original, and introducing reflected light from the original via an optical system composed of a mirror and the like into an image sensor in which photoelectric conversion elements such as a CCD (Charge Coupled Device) are arranged in multiple lines.

Such a scanner performs a shading correction for a scanned original image data in order to prevent the scanned image from being uneven caused by an unevenness of a light source amount, an irregular sensitivity of photoelectric conversion elements, and the like. In such a shading correction, a white reference plate provided in the scanner is scanned, and correction formulae to control an unevenness of output values between the photoelectric conversion elements are provided corresponding to the respective photoelectric conversion elements based on a reference image data obtained by scanning the white reference plate.

Practically, a shading correction is performed while scanning a black reference plate in addition to a white reference plate. In this description, however, an explanation about scanning the black reference plate is omitted.

In general, foreign objects such as dirt and dust are sometimes adhered to an optical mirror for introducing reflected light from an original into an image sensor. When locations of the foreign objects adhered to the mirror in a main scanning direction are not changed from when scanning a white reference plate for a shading correction when scanning an original, the shading correction is appropriately performed.

Meanwhile, a carriage mounting the mirror may be shifted in the main scanning direction for some reason when the carriage is moved in a sub scanning direction to scan the original. In this case, the locations of the foreign objects are to be shifted in the main scanning direction when scanning the original.

Thus, the shading correction in the locations of the foreign objects is not performed properly. Accordingly, in an output image based on a scanned original image data, white lines along the sub scanning direction are caused at locations corresponding to the locations of the foreign objects in the main scanning direction when scanning the white reference plate. Moreover, black lines along the sub scanning direction are caused at the locations corresponding to the locations of the foreign objects in the main scanning direction when scanning the original.

Even when the carriage is not shifted in the main scanning direction during moving, the similar improper phenomena as described above are caused in the output image when the foreign objects are moved on the mirror in the main scanning direction between the scan of the white reference plate and the scan of the original.

Then, Japanese Patent Laid-Open Publication No. 2006-270604 discloses a method for smoothing local drops of an image data value when the local drops in the image data value regarding a white reference plate is detected, and performing a shading correction by use of the smoothed image data, so as to suppress quality deterioration of an output image irrespective of whether foreign objects adhered to a mirror are moved or not.

SUMMARY OF THE INVENTION

In the method of Japanese Patent Laid-Open Publication No. 2006-270604, a luminance at a part corresponding to a foreign object becomes larger than before a smoothing process caused by approaching a peripheral luminance by the smoothing process of an image data regarding a white reference plate. In this case, a shading correction is performed by use of the image data after the smoothing process. Thus, when the luminance was low at the part corresponding to the foreign object in the image data regarding the white reference plate before the smoothing process, there were cases that the shading correction was not sufficient, and a black line in an output image caused by the foreign object could not be removed properly.

An object of the present invention is to provide a scanner capable of lowering a reduction in quality of an output image due to foreign objects such as dirt and dust adhered to an optical system, and a shading correction method for the scanner.

To achieve the above object, a first aspect of the present invention is a scanner comprising: an image scanning mechanism including a light source that emits light for irradiating a scan object, an optical system including a mirror, and an image sensor having photoelectric conversion elements arranged in line in a main scanning direction, the image scanning mechanism introducing reflected light of the emitted light from the scan object into the image sensor via the optical system and obtaining an image data corresponding to an image of the scan object with the image sensor; a foreign object location detector that detects a pixel at a foreign object location at which a local drop in luminance due to a foreign object adhered to the optical system is indicated in a waveform of a first reference image data showing a relationship between locations in the main scanning direction of pixels corresponding to the respective photoelectric conversion elements and luminance values of the respective pixels, based on the first reference image data obtained by scanning a white reference plate by the image scanning mechanism at an initial operation after power-on of the scanner; a foreign object location storage that stores a location in the main scanning direction of the pixel at the foreign object location detected by the foreign object location detector; a correction processor that corrects luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to a second reference image data obtained by scanning the white reference plate by the image scanning mechanism at a scanning operation of an original; and a shading correction processor that performs a shading correction to an original image data obtained by scanning the original by the image scanning mechanism by use of the second reference image data corrected by the correction processor.

The correction processor may calculate a value at each pixel location on first and second lines connecting a point at a same location as the pixel at the foreign object location having a smaller luminance value than the pixel at the foreign object location to both end points of the first range, respectively, in a waveform of the second reference image data, and determine for each pixel location within the first range as a luminance value for each pixel a larger value of the calculated value on the first and second lines at the each pixel location within the first range and a value obtained by subtracting a value, which is obtained by multiplying a predetermined factor by the difference value between the luminance value of the pixel at the one end of the first range and the luminance value of the pixel at the foreign object location, from the luminance value of the pixel at the one end of the first range.

The foreign object location detector may calculate a difference value in luminance between a pixel and an adjacent pixel on one side of the pixel for each pixel in the first reference image data, determine as a notice pixel a pixel having the calculated difference value of a first reference value or more, calculate an average value and a minimum value of luminance values of pixels within a third range including the notice pixel, and detect a pixel having the minimum value as the pixel at the foreign object location upon a difference value between the average value and the minimum value being a second reference value or more.

The luminance values of the pixels within the second range in the second reference image data corrected by the correction processor may be smaller than the luminance value of the pixel at the foreign object location before correction.

The image scanning mechanism may scan the white reference plate in a plurality of scanning points in a sub scanning direction perpendicular to the main scanning direction at the initial operation after power-on of the scanner and obtains a plurality of the first reference image data corresponding to the respective scanning points, and the foreign object location storage may store a corresponding foreign object location upon pixels at the foreign object location detected by the foreign object location detector in the plurality of the first reference image data being in a same location in the main scanning direction.

To achieve the above object, a second aspect of the present invention is a shading correction method for a scanner including an image scanning mechanism for emitting light to irradiate a scan object, introducing reflected light from the scan object into an image sensor that has photoelectric conversion elements arranged in line in a main scanning direction via an optical system including a mirror, and obtaining an image data corresponding to an image of the scan object with the image sensor, the shading correction method comprising: obtaining a first reference image data by scanning a white reference plate by the image scanning mechanism at an initial operation after power-on of the scanner; detecting a pixel at a foreign object location at which a local drop in luminance due to a foreign object adhered to the optical system is indicated in a waveform of the first reference image data showing a relationship between locations in the main scanning direction of pixels corresponding to the respective photoelectric conversion elements and luminance values of the respective pixels, based on the first reference image data; storing in a foreign object location storage a location in the main scanning direction of the pixel at the foreign object location; obtaining a second reference image data by scanning the white reference plate by the image scanning mechanism at a scanning operation of an original; correcting luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to the second reference image data; and performing a shading correction to an original image data obtained by scanning the original by the image scanning mechanism by use of the corrected second reference image data.

The correcting may comprise: calculating a value at each pixel location on first and second lines connecting a point at a same location as the pixel at the foreign object location having a smaller luminance value than the pixel at the foreign object location to both end points of the first range, respectively, in a waveform of the second reference image data; and determining for each pixel location within the first range as a luminance value for each pixel a larger value of the calculated value on the first and second lines at the each pixel location within the first range and a value obtained by subtracting a value, which is obtained by multiplying a predetermined factor by the difference value between the luminance value of the pixel at the one end of the first range and the luminance value of the pixel at the foreign object location, from the luminance value of the pixel at the one end of the first range.

The detecting may comprise: calculating a difference value in luminance between a pixel and an adjacent pixel on one side of the pixel for each pixel in the first reference image data; determining as a notice pixel a pixel having the calculated reference value of a first reference value or more; calculating an average value and a minimum value of luminance values of pixels within a third range including the notice pixel; and detecting a pixel having the minimum value as the pixel at the foreign object location upon a difference value between the average value and the minimum value being a second reference value or more.

According to the above-described configuration, it is possible to lower a reduction in quality of an output image due to foreign objects such as dirt and dust adhered to an optical system.

DETAILED DESCRIPTION OF THE EMBODIMENT

Figure 1:
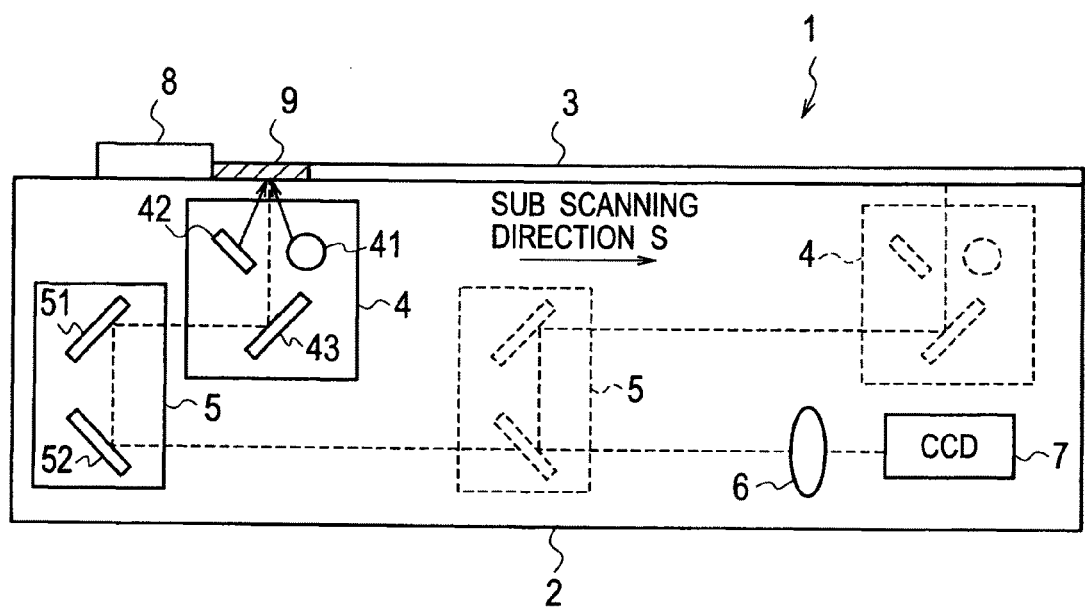
FIG. 1 is a schematic diagram of a scanner according to an embodiment of the present invention.

Hereinafter, a description will be made below in detail of an embodiment of the present invention with reference to the figures. Note that, common or similar members or elements are indicated with the same reference numerals through the figures, and the repetitive explanations are omitted or simplified.

FIG. 1 is a schematic diagram of a scanner 1 according to an embodiment of the present invention. As shown in FIG. 1, the scanner 1 according to the embodiment includes a contact glass 3 provided at an upper portion of a casing 2, a first carriage 4 provided in the casing 2 under the contact glass 3, a second carriage 5, a lens 6 and a CCD image sensor 7.

An original, which is a scan object, is placed on the contact glass 3. An original end plate 8 for positioning the original is provided at one end of the contact glass 3. Adjacent to the original end plate 8 of the contact glass 3, a white colored white reference plate 9 for supplying a reference image data for a shading correction.

The first carriage 4 includes a light source 41 for emitting light to irradiate the original placed on the contact glass 3, a reflector 42 for reflecting the light from the light source 41 to the original, and a first mirror 43 for introducing the reflected light from the original into the second carriage 5.

The second carriage 5 includes a second mirror 51 and a third mirror 52. The light from the first carriage 4 is reflected by the second mirror 51 and the third mirror 52 sequentially, so as to transmit the light to the lens 6.

The lens 6 collects the light from the second carriage 5 to introduce into the CCD image sensor 7.

Figure 2:
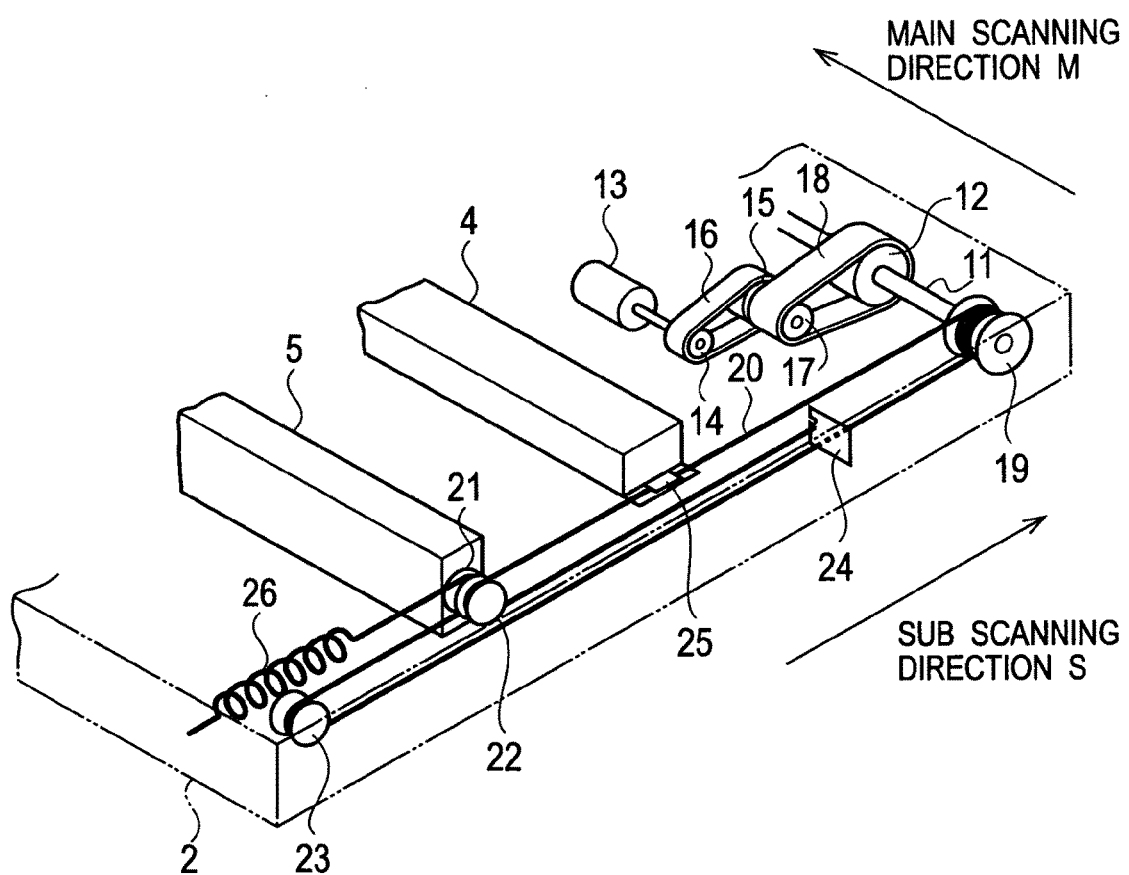
FIG. 2 is a perspective view showing a schematic configuration of a drive mechanism for moving first and second carriages of the scanner shown in FIG. 1.

The CCD image sensor 7 has a CCD (not shown in the figure) that is a plurality of photoelectric conversion elements arranged in lines in a main scanning direction M (a direction perpendicular to the paper of FIG. 1; refer to FIG. 2). The CCD image sensor 7 outputs an image data by photoelectrically converting the reflected light introduced from the original via the lens 6. Hereinafter, the CCD of the CCD image sensor 7 is referred to as a "pixel" arbitrarily.

In order to scan a whole area of an original when scanning, the first carriage 4 is configured to be movable in a whole area of the contact glass 3 in a sub scanning direction S perpendicular to the main scanning direction M. The second carriage 5 is configured to move in the sub scanning direction S being synchronized with the first carriage 4 with a half displacement of the first carriage 4, since a light path length from the original to the CCD image sensor 7 should be constant even if the first carriage moves.

FIG. 2 is a perspective view showing a schematic configuration of a drive mechanism for moving the first carriage 4 and the second carriage 5.

In FIG. 2, a drive shaft 11 of which an axis direction is the main scanning direction M is rotatably supported at one end of the casing 2 in a longitudinal direction. The drive shaft 11 is fitted into a driven-side pulley 12.

A motor 13 is arranged on a bottom plate of the casing 2. An output shaft of the motor 13 is fitted into a drive-side pulley 14. A first drive belt 16 is looped around the drive-side pulley 14 and a middle pulley 15. A second drive belt 18 is looped around the driven-side pulley 12 and a second middle pulley 17, which is integrally formed with the first middle pulley 15.

That means output rotations of the motor 13 are arbitrarily reduced in speed and transmitted to the driven-side pulley 12, so that the drive shaft 11 rotates at low speed. Thus, it is possible to rotate the drive shaft 11 smoothly, and suppress oscillations when the first carriage 4 and the second carriage 5 move being driven by the drive shaft 11.

Each end of the drive shaft 11 is fitted into respective roll-up pulleys 19. A middle portion of a wire 20 is wound on each roll-up pulley 19 with certain loops. A pair of guiding pulleys 21 and 22 is rotatably supported on the same axis in the main scanning direction M at a side surface of the second carriage 5. At another end opposite to the side provided with the drive shaft 11 of the casing 2, a guiding pulley 23 is rotatably supported on an axis in the main scanning direction M. A bracket 24 is provided at a certain point of a wall of the casing 2.

The roll-up pulley 19, the wire 20, the guiding pulleys 21 to 23 and the bracket 24 are provided at the respective side sandwiching each scanning range of the first carriage 4 and the second carriage 5 in the casing 2.

The wire 20 of which one end is fixed to the bracket 24 is wound on the guiding pulley 22, linked with the first carriage 4 by a linkage 25, wound on the roll-up pulley 19, wound on the guiding pulley 23 and the guiding pulley 22 respectively, and retained at a side wall of the casing 2 via a tension spring 26 that is another end of the wire 20 and composed of a tension coil spring and the like.

Since the wire 20 is wound on the guiding pulley 21 and the guiding pulley 22 respectively provided at the side surface of the second carriage 5 in such a way as to make a U-turn, the displacement of the second carriage 5 is to be half of that of the first carriage 4. Therefore, the light path length from the original to the CCD image sensor 7 can be kept at a constant level.

Figure 3:
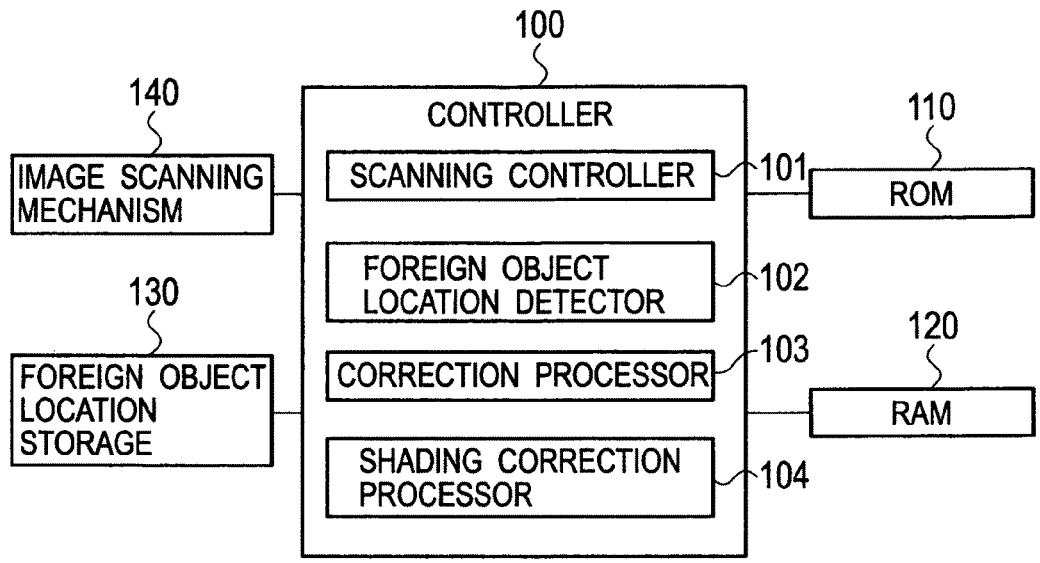
FIG. 3 is a block diagram showing a configuration of a control system of the scanner shown in FIG. 1.

FIG. 3 is a block diagram showing a configuration of a control system of the scanner 1. The scanner 1 includes a controller 100 composed of a CPU (Central Processing Unit) and the like, a ROM (Read Only Memory) 110 for storing programs by which the controller 100 controls the scanner 1, a RAM (Random Access Memory) 120 used for temporarily saving data and used as a working area of the controller 100 at calculations, and a foreign object location storage 130. A scanning controller 101, a foreign object location detector 102, a correction processor 103, and a shading correction processor 104 are configured by operating the controller 100 according to the programs stored in the ROM 110, for instance.

The scanning controller 101 performs data scanning by controlling an image scanning mechanism 140 composed of the first carriage 4, the second carriage 5, the lens 6, the CCD image sensor 7, and the like.

The foreign object detector 102 detects pixels at foreign object locations showing local luminance drops according to foreign objects such as dirt and dust adhered to a first mirror 43, a second mirror 51 and a third mirror 52, by use of an image data (first reference image data) obtained by scanning the white reference plate 9 by the image scanning mechanism 140 at an initial operation after turning on the scanner 1.

The correction processor 103 corrects waveforms so as to be formed in a trapezoidal shape in a predetermined range (first set range) including a foreign object location detected by the foreign object location detector 102 with respect to an image data (second reference image data). The image data is obtained by scanning the white reference plate 9 by the image scanning mechanism 140 when scanning an original.

The shading correction processor 104 provides shading correction formulae corresponding to each CCD when scanning the original, and corrects output levels of each CCD, by use of the second image data corrected by the correction processor 103.

The foreign object location storage 130 stores locations of the pixels at the foreign object locations in the main scanning direction M detected by the foreign object location detector 102.

Next, a description will be made of performance of the scanner 1.

The scanner 1 performs a detection of foreign object locations by use of a first reference image data obtained by scanning the white reference plate 9 at an initial operation just after turning on the scanner 1. Next, the scanner 1 corrects waveforms around the foreign object locations detected at the foreign object location detection at the initial operation so as to be formed in a trapezoidal shape with respect to a second reference image data obtained by scanning the white reference plate 9 for a shading correction when scanning an original. Then, the scanner 1 performs the shading correction for an original image data by use of the second reference image data after the correction.

Figure 4:
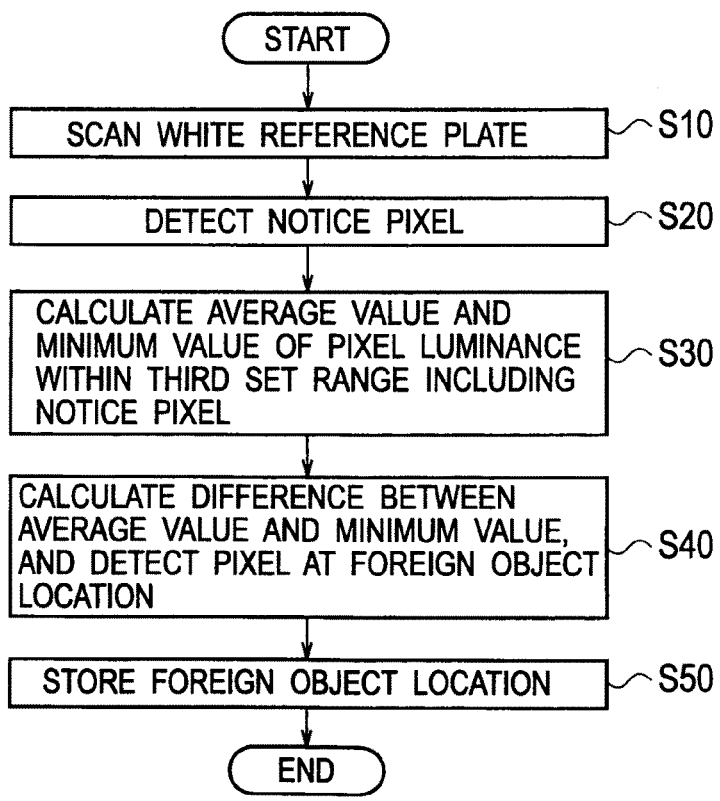
FIG. 4 is a flowchart showing steps of a foreign object detection process.
Figure 5A:
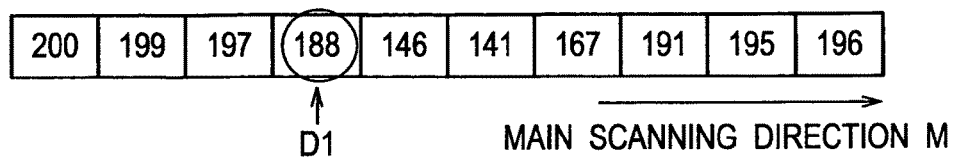
FIGS. 5A to 5C are schematic views for explaining steps of a foreign object location detection process.
Figure 5B:
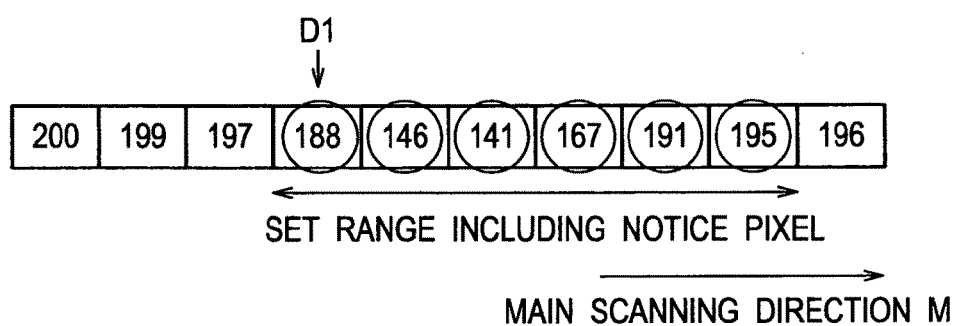
Figure 5C:
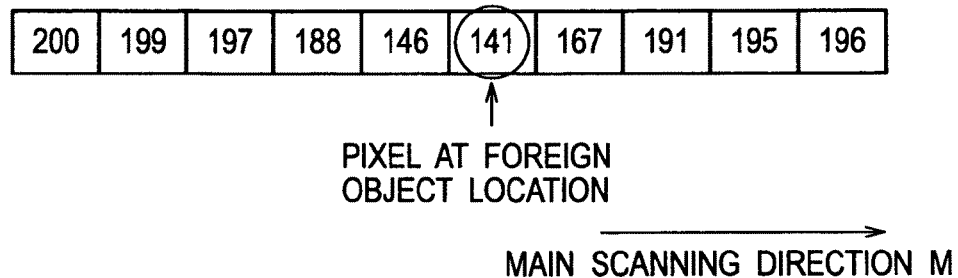

The following are descriptions of steps for the foreign object location detection. FIG. 4 is a flowchart showing steps of the foreign object detection process. FIGS. 5A to 5C are schematic views for explaining steps of the foreign object location detection process. Hereinafter, a description will be made of an example of scanning 3600 pixels by the CCD image sensor 7.

In Step S10, when the power is turned on, the scanning controller 101 moves the first carriage 4 under the white reference plate 9, and controls the image scanning mechanism 140 to scan reflected light of the white reference plate 9 by activating a light source. Then, the scanning controller 101 obtains a first reference image data, which is an image data of one line in the main scanning direction M obtained by scanning the white reference plate 9, from the image scanning mechanism 140, thereby storing the data in the RAM 120.

The image data obtained by the image scanning mechanism 140 is to be shown by 8-bit tones, and shown by values from 0 to 255 from darker to brighter images.

In Step S20, the foreign object location detector 102 calculates difference values of luminances (luminance values) between the respective adjacent pixels on one side in the main scanning direction M with regard to the respective pixels in the first reference image data. Then, the pixel in which the difference value is a first reference value or more is detected as a notice pixel D1. In the example shown in FIGS. 5A to 5C, the difference values of luminances between the corresponding pixels and the respective adjacent pixels on the right side are calculated in order from the left pixel shown in the figure. Then, the pixel having the difference value with 10 or more is assumed to be the notice pixel D1. In this case, as shown in FIG. 5A, the fourth pixel from left having a luminance 188 shown in the figure is detected as the notice pixel D1.

In Step S30, the foreign object location detector 102 calculates an average value and a minimum value of luminances of pixels within a predetermined range (third set range) including the notice pixel D1. For instance, as shown in FIG. 5B, an average value and a minimum value of the luminances from the notice pixel D1 to the sixth pixel in the right direction are calculated.

In Step S40, the foreign object location detector 102 calculates a difference value between the average value and the minimum value calculated in Step S30. When the difference value is a second reference value or more, the pixel corresponding to the minimum value is detected as a pixel at the foreign object location. For instance, the second reference value is assumed to be 10 in the example shown in FIGS. 5A to 5C. The average value of the luminances from the notice pixel D1 to the sixth pixel in the right direction is 171, and the minimum value is 141. Thus, the sixth pixel from left having a luminance 141 shown in the figure is detected as the pixel at the foreign object location.

In Step S50, the foreign object location detector 102 stores a location in the main scanning direction M (pixel number) of the pixel at the foreign object location detected in Step S40 in the foreign object location storage 130.

Figure 6:
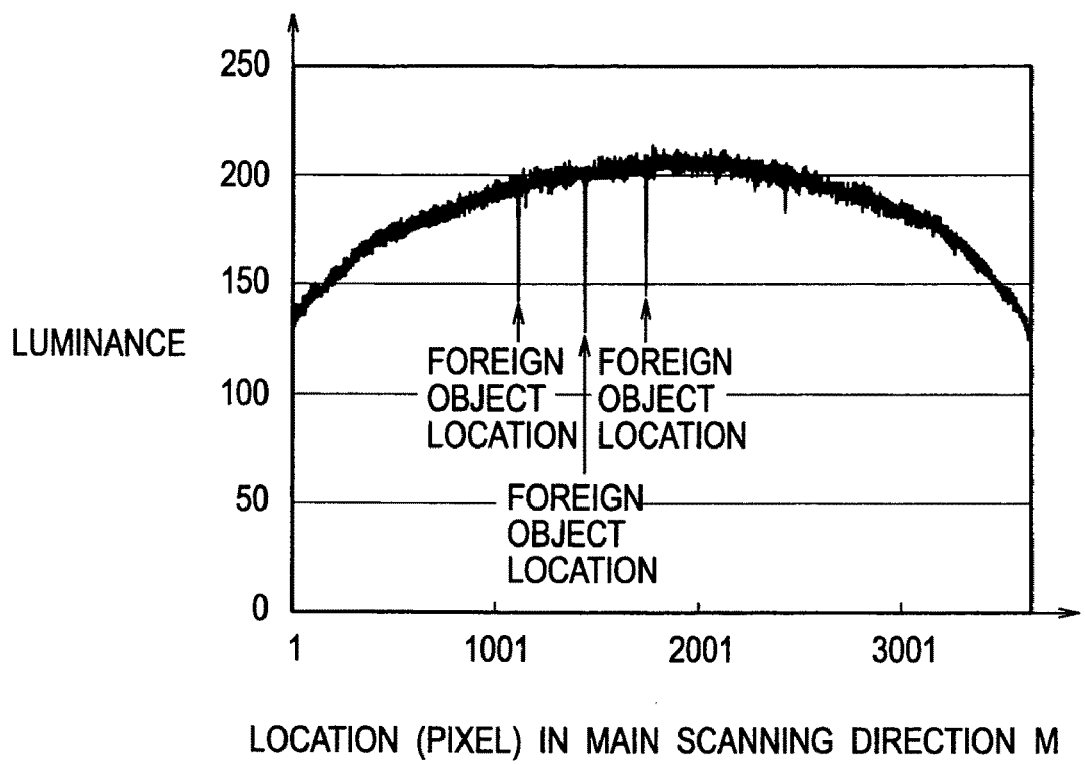
FIG. 6 is a waveform chart showing one example of a first reference image data.

Through a series of the steps as described above, in a waveform of the first reference image data as shown in FIG. 6, for instance, the pixels at three local luminance drops are detected as pixels at the foreign object locations.

Figure 7:
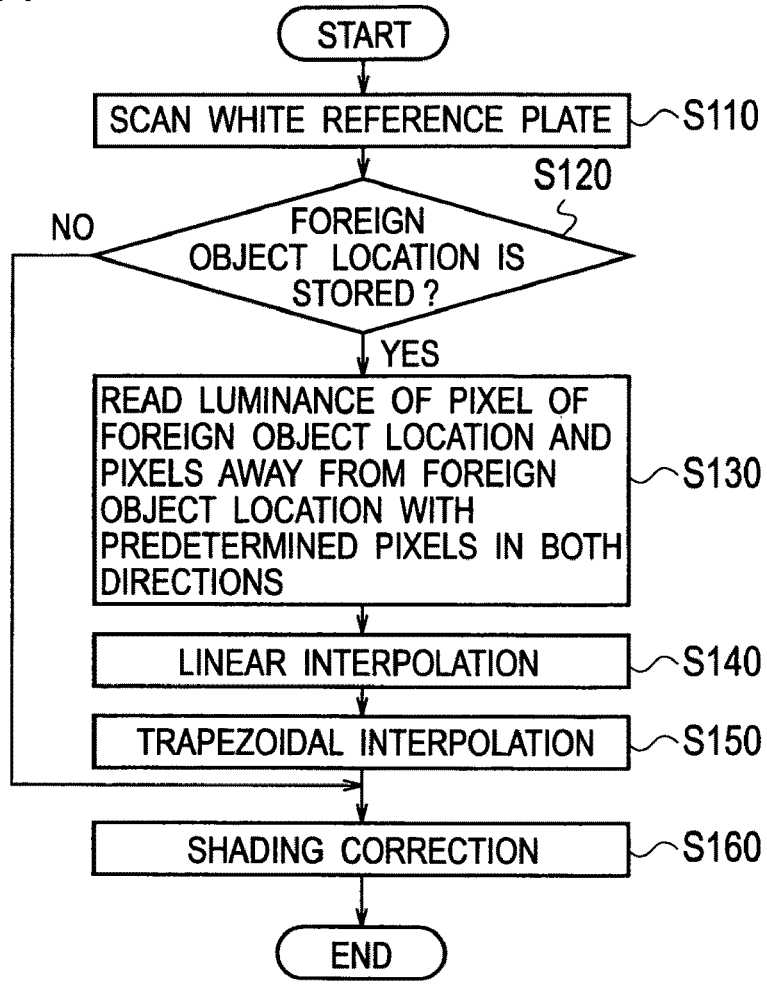
FIG. 7 is a flowchart showing a process when scanning an original.

Next, a description will be made of performance when scanning an original with reference to a flowchart shown in FIG. 7.

In Step S110, when scanning an original is commanded to start by a user operation, the scanning controller 101 directs the image scanning mechanism 140 to scan the white reference plate 9. Then, the scanning controller 101 obtains a second reference image data, which is an image data of one line in the main scanning direction M obtained by scanning the white reference plate 9, from the image scanning mechanism 140 thereby storing the data in the RAM 120.

In Step S120, the correction processor 103 determines whether the foreign object location detected by the above-described foreign object location detection process is stored in the foreign object location storage 130. When the location is stored (Step S120: YES), the correction processor 103 goes through Step S130. When the location is not stored (Step S120: NO), the correction processor 103 goes through Step S160.

In Step S130, the correction processor 103 reads luminances of a total of three pixels, which include a pixel corresponding to the foreign object location and pixels positioned a predetermined number of pixels away from the foreign object location in both side directions, from the second reference image data with regard to any foreign object location stored in the foreign object location storage 130.

Figure 8:
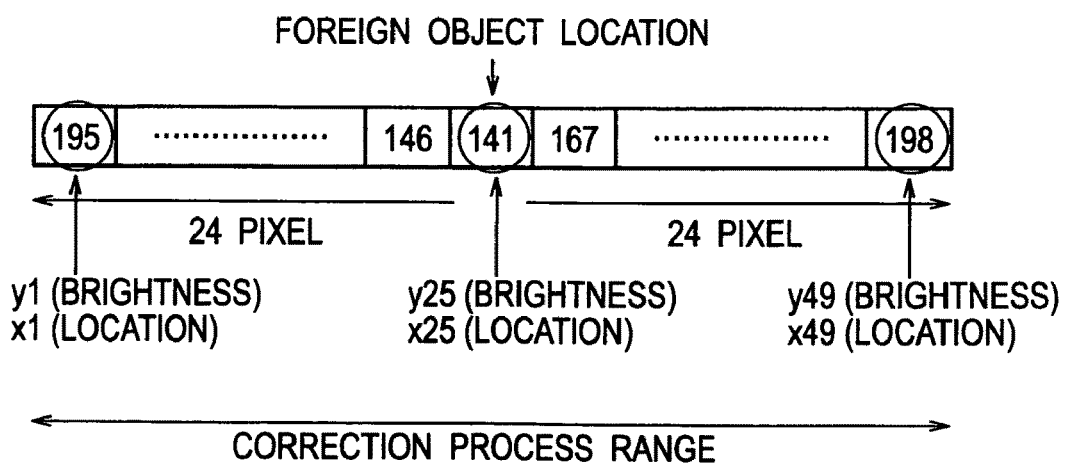
FIG. 8 is a view for explaining a correction process range by a correction processor.

For instance, as shown in FIG. 8, the correction processor 103 reads the three luminances of the pixel at the foreign object location and the two pixels positioned 24 pixels away from the pixel at the foreign object location in both side directions. Thus, 49 pixels centered on the foreign object location are defined as a correction process range (first set range). Note that, for convenience of explanation, locations of the pixels in the correction process range in the main scanning direction M are indicated by x1, x2, . . . , x49, and luminances of each pixel are indicated by y1, y2, . . . , y49.

Figure 9:
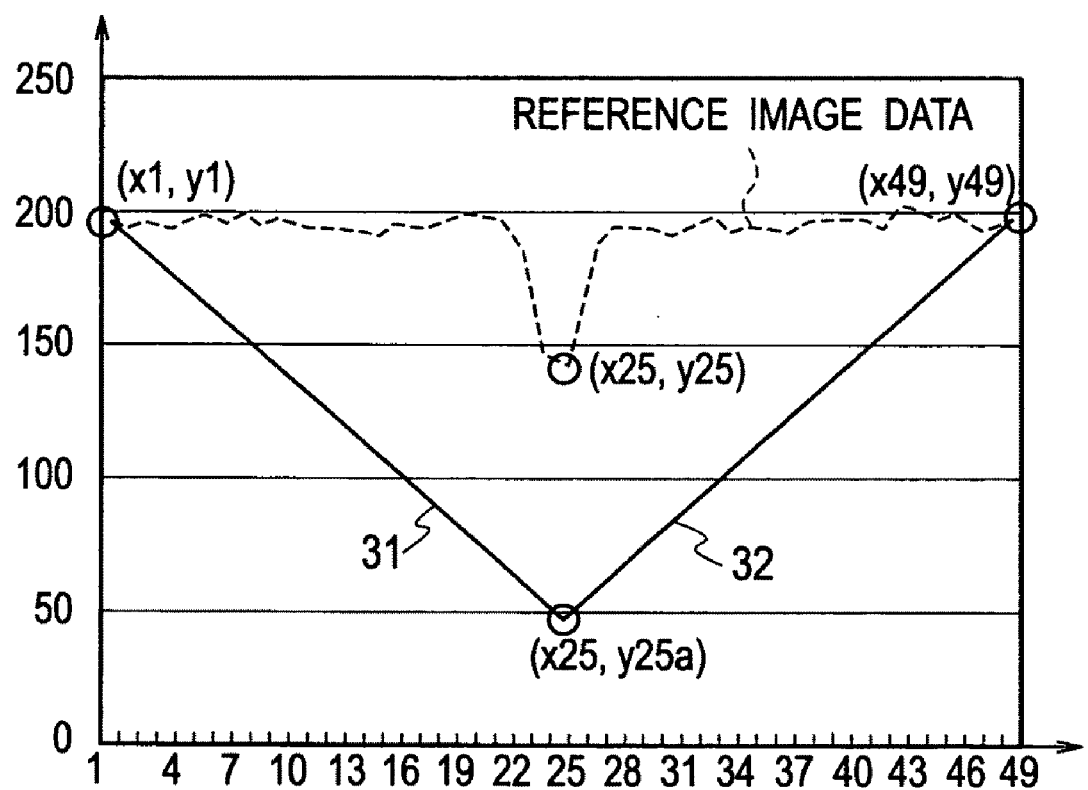
FIG. 9 is an explanatory view of a linear interpolation.

In Step S140, the correction processor 103 linearly interpolates three coordinates of (x1, y1), (x25, y25) and (x49, y49) on the x-y coordinate. In the linear interpolation process, as shown in FIG. 9, the correction processor 103 calculates values in each pixel location on first and second lines 31 and 32 connecting a point (x25, y25a) taking a smaller value y25a than y25 to (x1, y1) and (x49, y49), respectively.

Then, the correction processor 103 calculates a drop amount Y of the luminance of the foreign object location by use of the following formula (Formula 1) for the correction process range of each foreign object location. When the drop amount Y is 60% or more, the linear interpolation process and a trapezoidal interpolation process described later are not performed for the foreign object location since it is difficult to remove a black line in an output image caused by the foreign object.

$$Y=((y1+y49)/2-y25)\times 100/((y1+Y49)/2) \quad \text{(Formula 1)}$$

Figure 10:
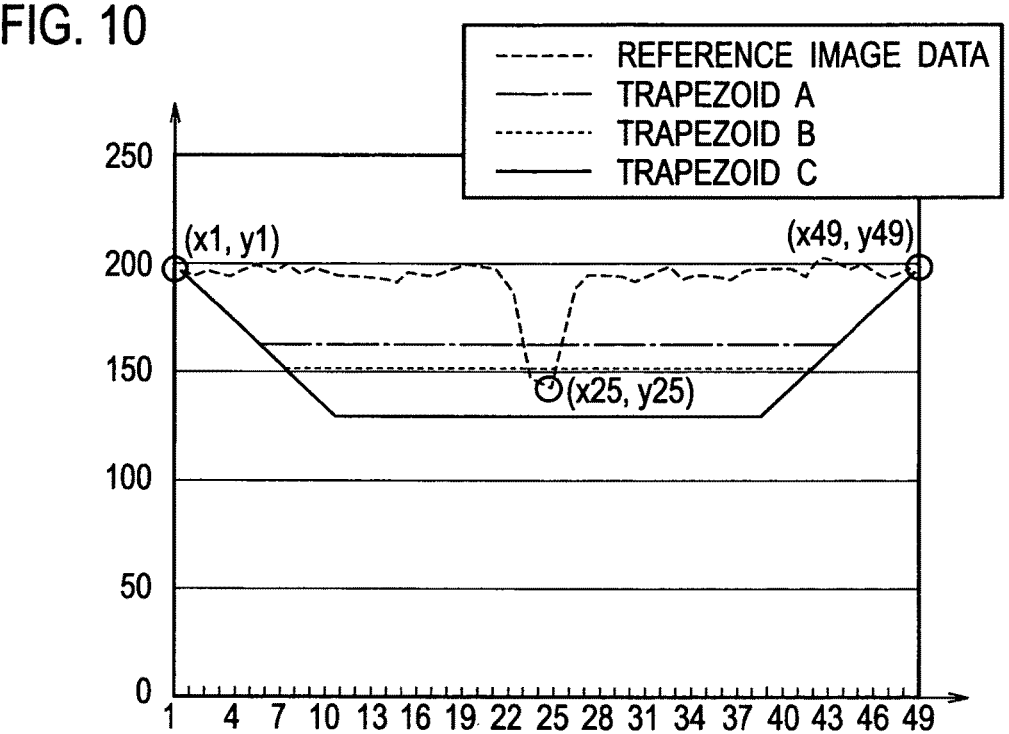
FIG. 10 is an explanatory view of a trapezoidal interpolation.

In Step S150, the correction processor 103 performs the trapezoidal interpolation process. In the process, the correction processor 103 calculates a trapezoidal interpolation value m composing a base of a trapezoid on the x-y coordinate by use of the following formula (Formula 2). Then, the correction processor 103 compares the values on the first and second lines 31 and 32 with the trapezoidal interpolation value m in each pixel location, and defines a larger value as a luminance for each pixel. Thus, the luminances of all the pixels in a predetermined range (second set range) including the pixel at the foreign object location result in m composing the base of the trapezoid. Therefore, a trapezoidal waveform is formed within the correction process range as shown in FIG. 10.

$$m=y1-k(y1-y25) \quad \text{(Formula 2)}$$

Note that, k is a factor (coefficient) defined according to a correction condition. For instance, a trapezoid A is formed when k=0.6, a trapezoid B is formed when k=0.8, and a trapezoid C is formed when k=1.2, as shown in FIG. 10. The larger the value k is, the more an effect to remove a black line in an output image caused by the foreign object is achieved. When k is configured to be more than 1, a value on the base of the trapezoid is less than y25. Thus, the higher black line removal effect can be expected.

The correction processor 103 writes the luminances of each pixel in the correction process range after the trapezoidal interpolation process over the corresponding values of each pixel in the second reference image data stored in the RAM 120.

In Step S160, the scanning controller 101 directs the image scanning mechanism 140 to scan an image of the original. Then, the shading correction processor 104 performs a shading correction process for an original image data obtained by scanning the original by the image scanning mechanism 140 by use of the second image data stored in the RAM 120 after the process by the correction processor 103.

In the above-described linear interpolation process and trapezoidal interpolation process by the correction processor 103, when there are two or more foreign object locations, the processes are performed for each foreign object location. However, when a certain foreign object location is included in a correction process range of another foreign object location, such processes are performed for the correction process range corresponding to the foreign object location having the smallest luminance.

In order to keep the correction process range in the correction processor 103, the location detection is not to be performed for the respective 24 pixels in both ends of the effective pixels in the above-described foreign object location detection process.

With regard to the trapezoidal waveform shown in FIG. 10, when inclination angles of oblique lines are too steep, edge enhancement tends to be emphasized. Also, a black line may be caused in the output image since luminance differences between adjacent pixels in the oblique lines are large. Therefore, the above-mentioned value y25a is preferably configured to be a value such that the inclination angles of the oblique lines (lines 31, 32) of the trapezoidal waveform are not too large.

When the original is scanned, the first carriage 4 and the second carriage 5 moved in the sub scanning direction S may be shifted in the main scanning direction M while moving in the sub scanning direction S due to a roll-up inclination of the wire 20 by the roll-up pulley 19, for instance.

Figure 11:
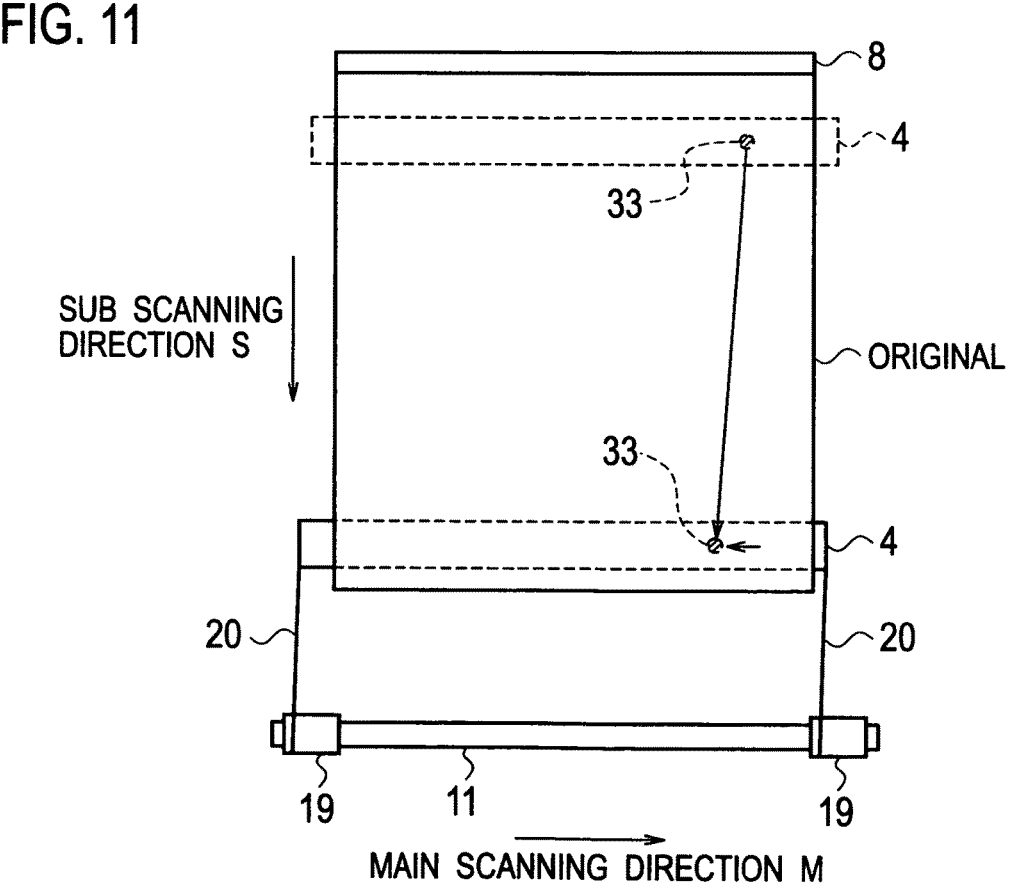
FIG. 11 is a schematic view for explaining a movement of a foreign object in a main scanning direction when scanning an original.

In this case, as shown in FIG. 11, when it is assumed that a foreign object 33 is adhered to the first mirror 43 of the first carriage 4, the foreign object 33 is also shifted in the main scanning direction M with the first carriage 4.

Figure 12A:
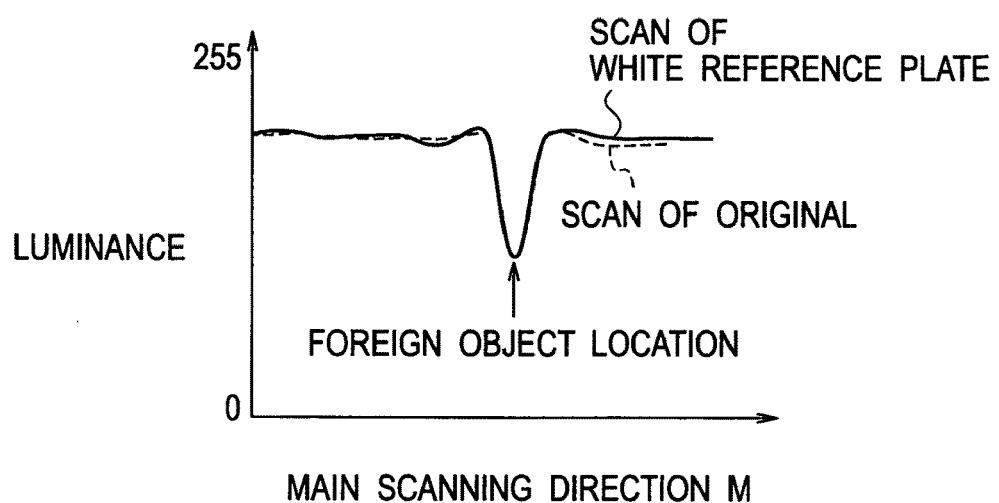
FIGS. 12A and 12B are views for explaining a movement of a foreign object in an image data.
Figure 12B:
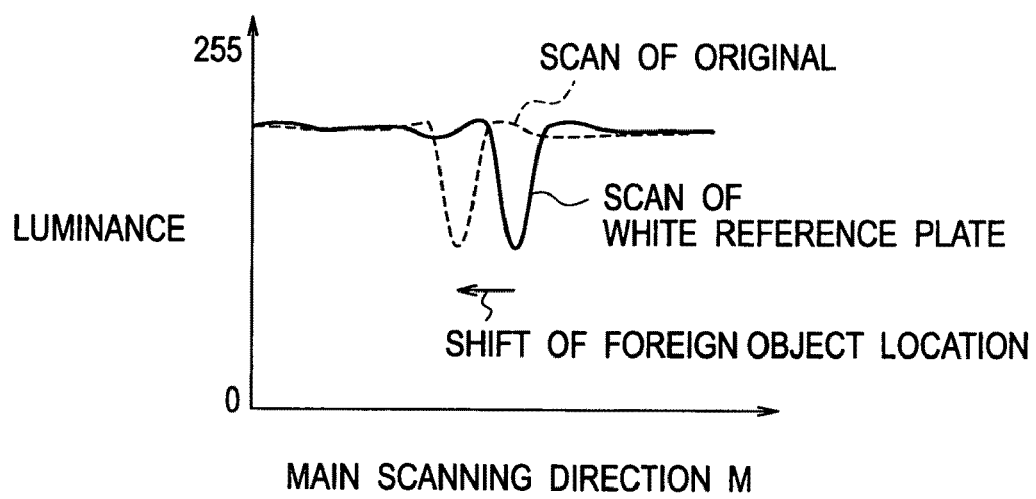

When the first carriage 4 is not shifted in the main scanning direction M when scanning the original, data of the foreign object location is appropriately corrected by the shading correction. This is because a luminance drop is shown in the scanned image data, which shows that the foreign object is located at the same position when scanning the white reference plate 9 and when scanning the original, as shown in FIG. 12A.

Figure 13:
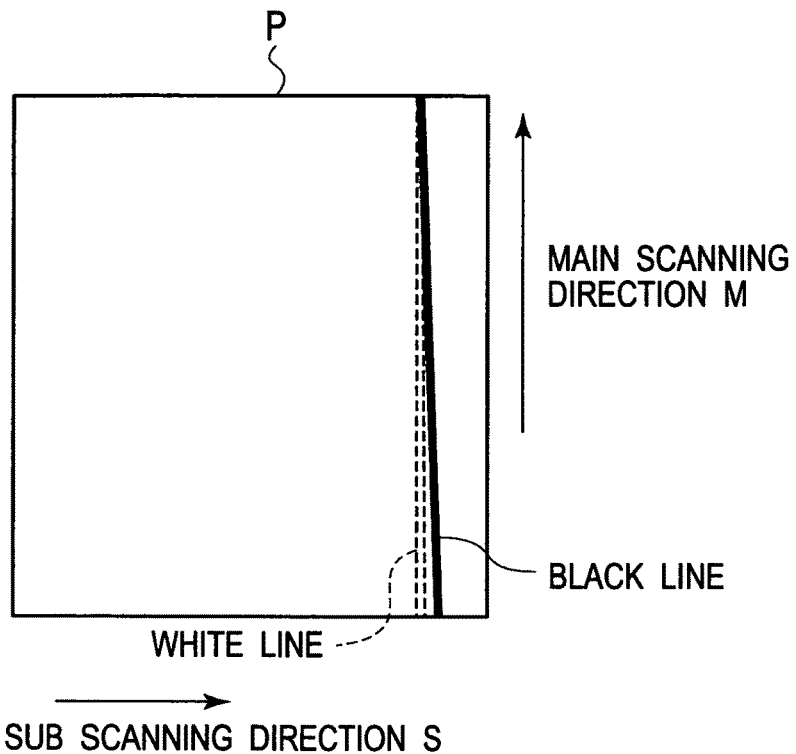
FIG. 13 is a view showing an output image when a foreign object is moved in a main scanning direction when scanning an original.

While, when the first carriage 4 is shifted in the main scanning direction M when scanning the original, the foreign object location is shifted in the main scanning direction M. Thus, the shading correction at the foreign object location is not corrected properly. In addition, in a sheet P printed based on the original image data as shown in FIG. 13, a white line along the sub scanning direction S is caused at a location corresponding to the foreign object location in the main scanning direction M when scanning the white reference plate 9. Moreover, a black line along the sub scanning direction S is caused at a location corresponding to the foreign object location in the main scanning direction M when scanning the original.

Even when the first carriage 4 and the second carriage 5 are not shifted in the main scanning direction M during moving, the similar improper phenomena as described above are caused in the output image when the foreign object is moved on the mirror in the main scanning direction M between the scan of the white reference plate 9 and the scan of the original.

Figure 14:
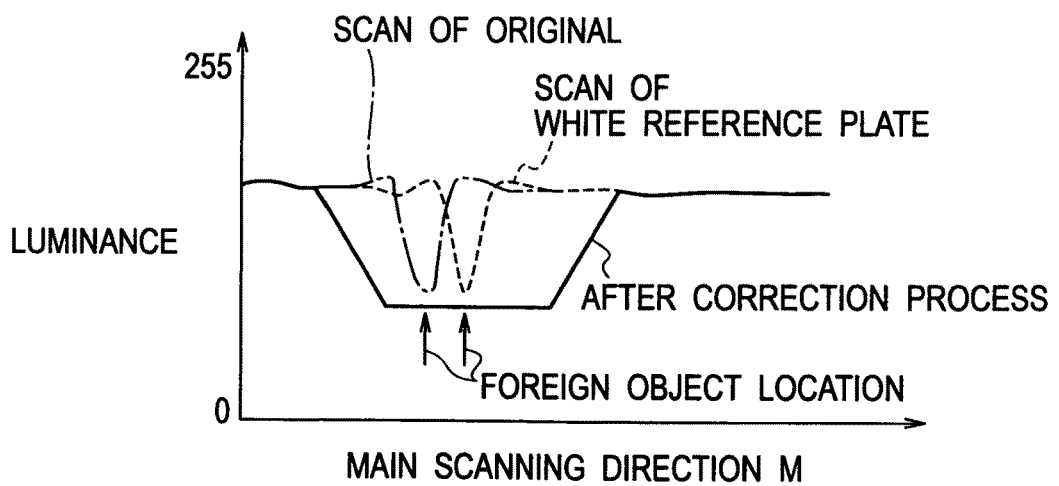
FIG. 14 is a view showing waveforms adjacent to a foreign object location in a second reference image data before and after a correction process by a correction processor.

On the other hand, in the present embodiment, the waveform around the foreign object location in the second reference image data obtained by scanning the white reference plate 9 is corrected so as to be formed in a trapezoidal shape as shown in FIG. 14 by the above-mentioned process by the correction processor 103, and the shading correction is performed by use of the second reference image data after the correction. Therefore, the shading correction is properly performed for the foreign object location even when the foreign object location is shifted to either the left or right direction in the main scanning direction M.

The value on the base of the trapezoid in the second reference image data after the correction is defined as a value calculated by the formula (Formula 2) using the pixel luminance of the foreign object location. Therefore, the shading correction can be maintained sufficiently, and it is possible to suppress a black line in an output image due to the foreign object.

Figure 15A:
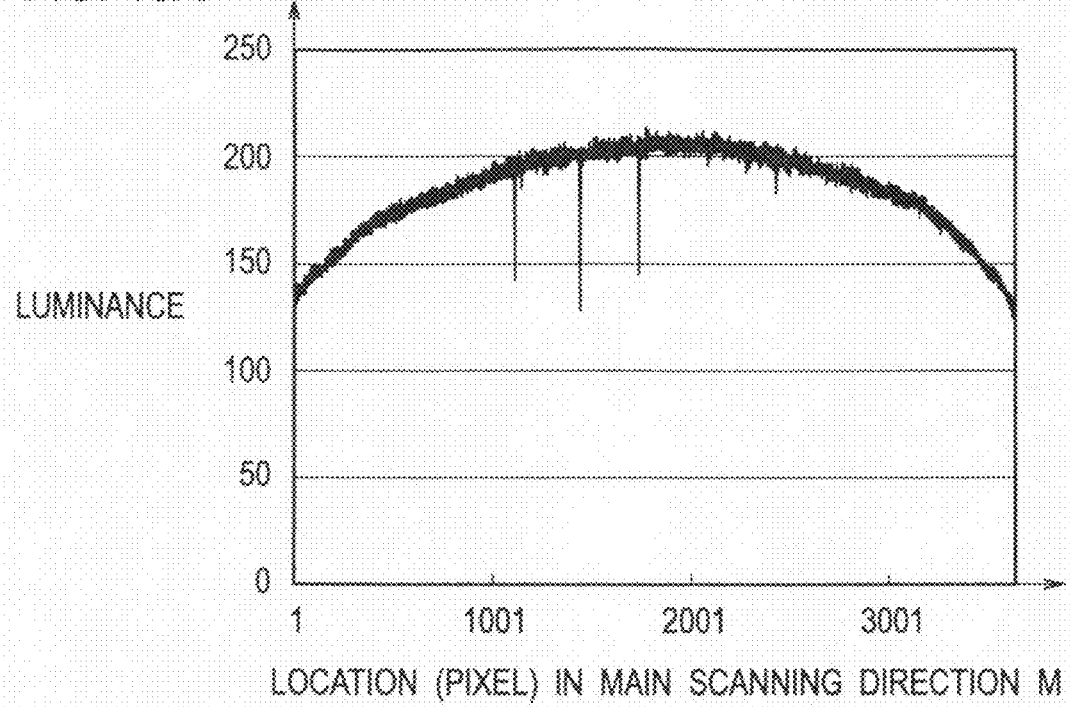
FIGS. 15A and 15B are waveform charts showing one example of a second reference image data before and after a correction process by a correction processor.
Figure 15B:
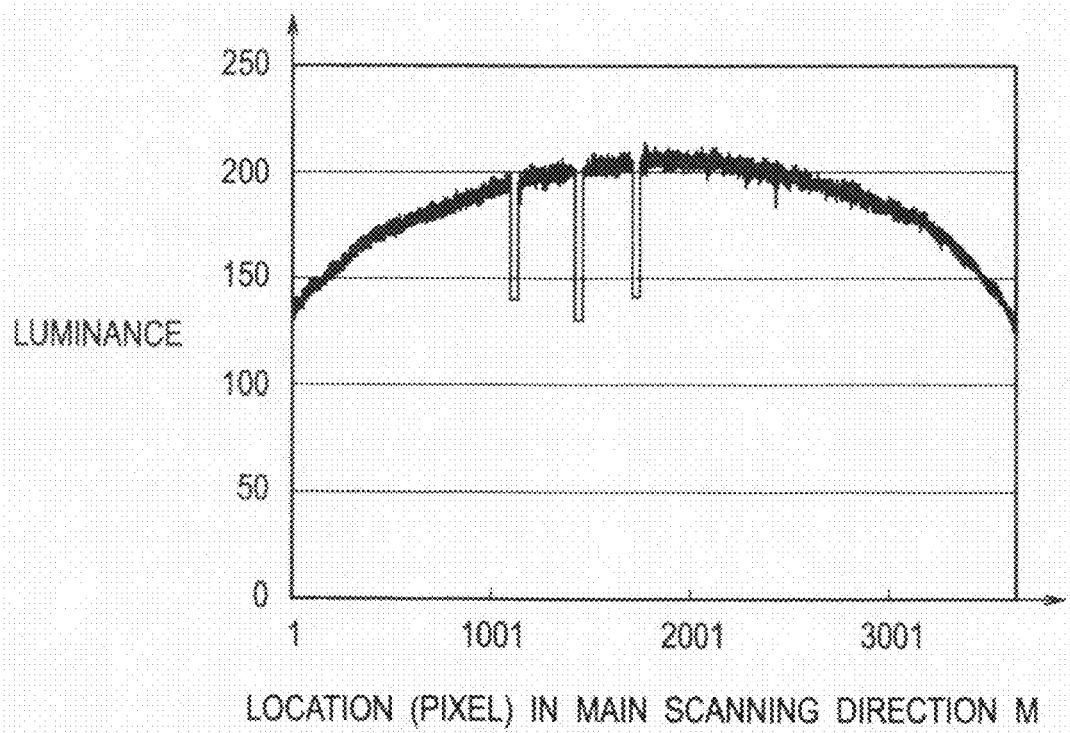

FIG. 15A is a view showing an example of a waveform of an image data (second reference image data) obtained by scanning the white reference plate 9. By performing the above-mentioned process by the correction processor 103 for the data, the data that the waveform around foreign object locations is corrected to be formed in a trapezoidal shape can be obtained as shown in FIG. 15B. Then, by performing a shading correction using the image data after the correction, it is possible to suppress reduction in quality of an output image caused by the foreign objects.

In the foreign object location detection process, the white reference plate 9 may be scanned in a plurality of points in the sub scanning direction S and a plurality of image data (first reference image data) corresponding to the plurality of the scanning points may be obtained. And only when every pixel at the foreign object location detected by the foreign object detector 102 for every first reference image data obtained in every scanning point is at the same location in the main scanning direction M, the detected foreign object location may be stored in the foreign object location storage 130. Thus, it is possible to improve accuracy of the foreign object detection.

The scanner and shading correction method for the scanner according to the embodiment of the present invention have been described above. However, the invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

What is claimed is:

1. A shading correction method for a scanner including an image scanning mechanism for emitting light to irradiate a scan object, introducing reflected light from the scan object into an image sensor that has photoelectric conversion elements arranged in line in a main scanning direction via an optical system including a mirror, and obtaining an image data corresponding to an image of the scan object with the image sensor, the shading correction method comprising:
   obtaining a first reference image data by scanning a white reference plate by the image scanning mechanism at an initial operation after power-on of the scanner;
   detecting a pixel at a foreign object location at which a local drop in luminance due to a foreign object adhered to the optical system is indicated in a waveform of the first reference image data showing a relationship between locations in the main scanning direction of pixels corresponding to the respective photoelectric conversion elements and luminance values of the respective pixels, based on the first reference image data;
   storing in a foreign object location storage a location in the main scanning direction of the pixel at the foreign object location;
   obtaining a second reference image data by scanning the white reference plate by the image scanning mechanism at a scanning operation of an original;
   correcting luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to the second reference image data; and
   performing a shading correction to an original image data obtained by scanning the original by the image scanning mechanism by use of the corrected second reference image data,
wherein the luminance values of the pixels within the second range in the second reference image data corrected by the correction processor are smaller that the luminance value of the pixel at the foreign object location before correction.

2. A scanner comprising:
an image scanning mechanism including
   a light source that emits light for irradiating a scan object,
   an optical system including a mirror, and
   an image sensor having photoelectric conversion elements arranged in line in a main scanning direction,
      the image scanning mechanism introducing reflected light of the emitted light from the scan object into the image sensor via the optical system and obtaining an image data corresponding to an image of the scan object with the image sensor;
a foreign object location detector that detects a pixel at a foreign object location at which a local drop in luminance due to a foreign object adhered to the optical system is indicated in a waveform of a first reference image data showing a relationship between locations in the main scanning direction of pixels corresponding to the respective photoelectric conversion elements and luminance values of the respective pixels, based on the first reference image data obtained by scanning a white reference plate by the image scanning mechanism at an initial operation after power-on of the scanner;
a foreign object location storage that stores a location in the main scanning direction of the pixel at the foreign object location detected by the foreign object location detector;
a correction processor that corrects luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to a second reference image data obtained by scanning the white reference plate by the image scanning mechanism at a scanning operation of an original; and
a shading correction processor that performs a shading correction to an original image data obtained by scanning the original by the image scanning mechanism by use of the second reference image data corrected by the correction processor,
wherein the correction processor
calculates a value at each pixel location on first and second lines connecting a point at a same location as the pixel at the foreign object location having a smaller luminance value than the pixel at the foreign object location to both end points of the first range, respectively, in a waveform of the second reference image data, and
determines for each pixel location within the first range as a luminance value for each pixel a larger value of the calculated value on the first and second lines at the each pixel location within the first range and a value obtained by subtracting a value, which is obtained by multiplying a predetermined factor by the difference value between the luminance value of the pixel at the one end of the first range and the luminance value of the pixel at the foreign object location, from the luminance value of the pixel at the one end of the first range.

3. A scanner comprising:

an image scanning mechanism including
- a light source that emits light for irradiating a scan object,
- an optical system including a mirror, and
- an image sensor having photoelectric conversion elements arranged in line in a main scanning direction, the image scanning mechanism introducing reflected light of the emitted light from the scan object into the image sensor via the optical system and obtaining an image data corresponding to an image of the scan object with the image sensor;

a foreign object location detector that detects a pixel at a foreign object location at which a local drop in luminance due to a foreign object adhered to the optical system is indicated in a waveform of a first reference image data showing a relationship between locations in the main scanning direction of pixels corresponding to the respective photoelectric conversion elements and luminance values of the respective pixels, based on the first reference image data obtained by scanning a white reference plate by the image scanning mechanism at an initial operation after power-on of the scanner;

a foreign object location storage that stores a location in the main scanning direction of the pixel at the foreign object location detected by the foreign object location detector;

a correction processor that corrects luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to a second reference image data obtained by scanning the white reference plate by the image scanning mechanism at a scanning operation of an original; and a shading correction processor that performs a shading correction to an original image data obtained by scanning the original by the image scanning mechanism by use of the second reference image data corrected by the correction processor, wherein the foreign object location detector calculates a difference value in luminance between a pixel and an adjacent pixel on one side of the pixel for each pixel in the first reference image data, determines as a notice pixel a pixel having the calculated difference value of a first reference value or more, calculates an average value and a minimum value of luminance values of pixels within a third range including the notice pixel, and detects a pixel having the minimum value as the pixel at the foreign object location upon a difference value between the average value and the minimum value being a second reference value or more.

4. A scanner comprising:

an image scanning mechanism including
- a light source that emits light for irradiating a scan object,
- an optical system including a mirror, and
- an image sensor having photoelectric conversion elements arranged in line in a main scanning direction, the image scanning mechanism introducing reflected light of the emitted light from the scan object into the image sensor via the optical system and obtaining an image data corresponding to an image of the scan object with the image sensor;

a foreign object location detector that detects a pixel at a foreign object location at which a local drop in luminance due to a foreign object adhered to the optical system is indicated in a waveform of a first reference image data showing a relationship between locations in the main scanning direction of pixels corresponding to the respective photoelectric conversion elements and luminance values of the respective pixels, based on the first reference image data obtained by scanning a white reference plate by the image scanning mechanism at an initial operation after power-on of the scanner;

a foreign object location storage that stores a location in the main scanning direction of the pixel at the foreign object location detected by the foreign object location detector;

a correction processor that corrects luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to a second reference image data obtained by scanning the white reference plate by the image scanning mechanism at a scanning operation of an original; and a shading correction processor that performs a shading correction to an original image data obtained by scanning the original by the image scanning mechanism by use of the second reference image data corrected by the correction processor, wherein the luminance values of the pixels within the second range in the second reference image data corrected by the correction processor are smaller that the luminance value of the pixel at the foreign object location before correction.

5. A scanner comprising:

an image scanning mechanism including
- a light source that emits light for irradiating a scan object,
- an optical system including a mirror, and
- an image sensor having photoelectric conversion elements arranged in line in a main scanning direction, the image scanning mechanism introducing reflected light of the emitted light from the scan object into the image sensor via the optical system and obtaining an image data corresponding to an image of the scan object with the image sensor;

a foreign object location detector that detects a pixel at a foreign object location at which a local drop in luminance due to a foreign object adhered to the optical system is indicated in a waveform of a first reference image data showing a relationship between locations in the main scanning direction of pixels corresponding to the respective photoelectric conversion elements and luminance values of the respective pixels, based on the first reference image data obtained by scanning a white reference plate by the image scanning mechanism at an initial operation after power-on of the scanner;

a foreign object location storage that stores a location in the main scanning direction of the pixel at the foreign object location detected by the foreign object location detector;

a correction processor that corrects luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to a second reference image data obtained by scanning the white reference plate by the image scanning mechanism at a scanning operation of an original; and a shading correction processor that performs a shading correction to an original image data obtained by scanning the original by the image scanning mechanism by use of the second reference image data corrected by the correction processor, wherein the image scanning mechanism scans the white reference plate in a plurality of scanning points in a sub scanning direction perpendicular to the main scanning direction at the initial operation after power-on of the scanner and obtains a plurality of the first reference image data corresponding to the respective scanning points, and the foreign object location storage stores a corresponding foreign object location upon every pixel at the foreign object location detected by the foreign object location detector for every first reference image data obtained in every scanning point being at a same location in the main scanning direction.

6. A shading correction method for a scanner including an image scanning mechanism for emitting light to irradiate a scan object, introducing reflected light from the scan object into an image sensor that has photoelectric conversion elements arranged in line in a main scanning direction via an optical system including a mirror, and obtaining an image data corresponding to an image of the scan object with the image sensor, the shading correction method comprising:

obtaining a first reference image data by scanning a white reference plate by the image scanning mechanism at an initial operation after power-on of the scanner;

detecting a pixel at a foreign object location at which a local drop in luminance due to a foreign object adhered to the optical system is indicated in a waveform of the first reference image data showing a relationship between locations in the main scanning direction of pixels corresponding to the respective photoelectric conversion elements and luminance values of the respective pixels, based on the first reference image data;

storing in a foreign object location storage a location in the main scanning direction of the pixel at the foreign object location;

obtaining a second reference image data by scanning the white reference plate by the image scanning mechanism at a scanning operation of an original;

correcting luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to the second reference image data; and performing a shading correction to an original image data obtained by scanning the original by the image scanning mechanism by use of the corrected second reference image data, wherein the image scanning mechanism scans the white reference plate in a plurality of scanning points in a sub scanning direction perpendicular to the main scanning direction at the initial operation after power-on of the scanner and obtains a plurality of the first reference image data corresponding to the respective scanning points, and the foreign object location storage stores a corresponding foreign object location upon every pixel at the foreign object location detected by the foreign object location detector for every first reference image data obtained in every scanning point being at a same location in the main scanning direction.

7. A shading correction method for a scanner including an image scanning mechanism for emitting light to irradiate a scan object, introducing reflected light from the scan object into an image sensor that has photoelectric conversion elements arranged in line in a main scanning direction via an optical system including a mirror, and obtaining an image data corresponding to an image of the scan object with the image sensor, the shading correction method comprising:

obtaining a first reference image data by scanning a white reference plate by the image scanning mechanism at an initial operation after power-on of the scanner;

detecting a pixel at a foreign object location at which a local drop in luminance due to a foreign object adhered to the optical system is indicated in a waveform of the first reference image data showing a relationship between locations in the main scanning direction of pixels corresponding to the respective photoelectric conversion elements and luminance values of the respective pixels, based on the first reference image data;

storing in a foreign object location storage a location in the main scanning direction of the pixel at the foreign object location;

obtaining a second reference image data by scanning the white reference plate by the image scanning mechanism at a scanning operation of an original;

correcting luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to the second reference image data; and performing a shading correction to an original image data obtained by scanning the original by the image scanning mechanism by use of the corrected second reference image data wherein the correcting comprises:

calculating a value at each pixel location on first and second lines connecting a point at a same location as the pixel at the foreign object location having a smaller luminance value than the pixel at the foreign object location to both end points of the first range, respectively, in a waveform of the second reference image data; and determining for each pixel location within the first range as a luminance value for each pixel a larger value of the calculated value on the first and second lines at the each pixel location within the first range and a value obtained by subtracting a value, which is obtained by multiplying a predetermined factor by the difference value between the luminance value of the pixel at the one end of the first range and the luminance value of the pixel at the foreign object location, from the luminance value of the pixel at the one end of the first range.

8. A shading correction method for a scanner including an image scanning mechanism for emitting light to irradiate a scan object, introducing reflected light from the scan object into an image sensor that has photoelectric conversion elements arranged in line in a main scanning direction via an optical system including a mirror, and obtaining an image data corresponding to an image of the scan object with the image sensor, the shading correction method comprising:

obtaining a first reference image data by scanning a white reference plate by the image scanning mechanism at an initial operation after power-on of the scanner;

detecting a pixel at a foreign object location at which a local drop in luminance due to a foreign object adhered to the optical system is indicated in a waveform of the first reference image data showing a relationship between locations in the main scanning direction of pixels corresponding to the respective photoelectric conversion elements and luminance values of the respective pixels, based on the first reference image data;

storing in a foreign object location storage a location in the main scanning direction of the pixel at the foreign object location;

obtaining a second reference image data by scanning the white reference plate by the image scanning mechanism at a scanning operation of an original;

correcting luminance values of all pixels within a second range including the pixel at the foreign object location within a first range in the main scanning direction centered on the pixel at the foreign object location stored in the foreign object location storage so as to be a value calculated by using a difference value between a luminance value of a pixel at one end of the first range and a luminance value of the pixel at the foreign object location, with respect to the second reference image data; and performing a shading correction to an original image data obtained by scanning the original by the image scanning mechanism by use of the corrected second reference image data wherein the detecting comprises:

calculating a difference value in luminance between a pixel and an adjacent pixel on one side of the pixel for each pixel in the first reference image data;

determining as a notice pixel a pixel having the calculated reference value of a first reference value or more;

calculating an average value and a minimum value of luminance values of pixels within a third range including the notice pixel; and detecting a pixel having the minimum value as the pixel at the foreign object location upon a difference value between the average value and the minimum value being a second reference value or more.

\* \* \* \* \*